(12) United States Patent
Wang et al.

(10) Patent No.: US 11,930,539 B2
(45) Date of Patent: Mar. 12, 2024

(54) ACTIVE INTERFERENCE CANCELLATION FOR RANDOM-ACCESS CHANNEL

(71) Applicant: QUALCOMM Incorporated, San Diego, CA (US)

(72) Inventors: Xiaojie Wang, Hillsborough, NJ (US); Xiaoxia Zhang, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 220 days.

(21) Appl. No.: 17/489,312

(22) Filed: Sep. 29, 2021

(65) Prior Publication Data

US 2023/0099924 A1 Mar. 30, 2023

(51) Int. Cl.
*H04W 74/08* (2009.01)
*H04L 27/26* (2006.01)
*H04W 72/0453* (2023.01)
*H04W 74/00* (2009.01)

(52) U.S. Cl.
CPC ... *H04W 74/0841* (2013.01); *H04L 27/26025* (2021.01); *H04W 72/0453* (2013.01); *H04W 74/002* (2013.01)

(58) Field of Classification Search
CPC ......... H04W 74/0841; H04W 72/0453; H04W 74/002; H04L 27/26025
See application file for complete search history.

(56) References Cited

U.S. PATENT DOCUMENTS

| | | | |
|---|---|---|---|
| 2019/0110313 A1* | 4/2019 | Islam | H04L 27/2607 |
| 2020/0221506 A1* | 7/2020 | Jeon | H04W 74/0808 |
| 2020/0267772 A1* | 8/2020 | Jung | H04W 72/21 |
| 2020/0367284 A1* | 11/2020 | Lei | H04W 74/0808 |
| 2021/0029738 A1* | 1/2021 | Zhou | H04W 74/006 |
| 2021/0136836 A1* | 5/2021 | Berggren | H04L 5/0053 |
| 2022/0264659 A1* | 8/2022 | Enbuske | H04W 74/002 |

FOREIGN PATENT DOCUMENTS

| | | | | |
|---|---|---|---|---|
| CN | 104244262 A | * | 12/2014 | |
| EP | 2874363 A1 | * | 5/2015 | ....... H04L 25/03834 |
| EP | 3442151 B1 | * | 7/2021 | ......... H04L 27/2613 |

* cited by examiner

Primary Examiner — Yu-Wen Chang
(74) Attorney, Agent, or Firm — ArentFox Schiff LLP

(57) ABSTRACT

A user equipment may be configured to perform active interference cancellation for random-access channel. In some aspects, the user equipment may receive, from a base station, physical layer random-access channel (PRACH) configuration information including one or more active interference cancellation (AIC) parameters for applying AIC to a PRACH message to the base station. Further, the user equipment may transmit, to the base station, the PRACH message with one or more AIC subcarriers based on the one or more AIC parameters.

30 Claims, 11 Drawing Sheets

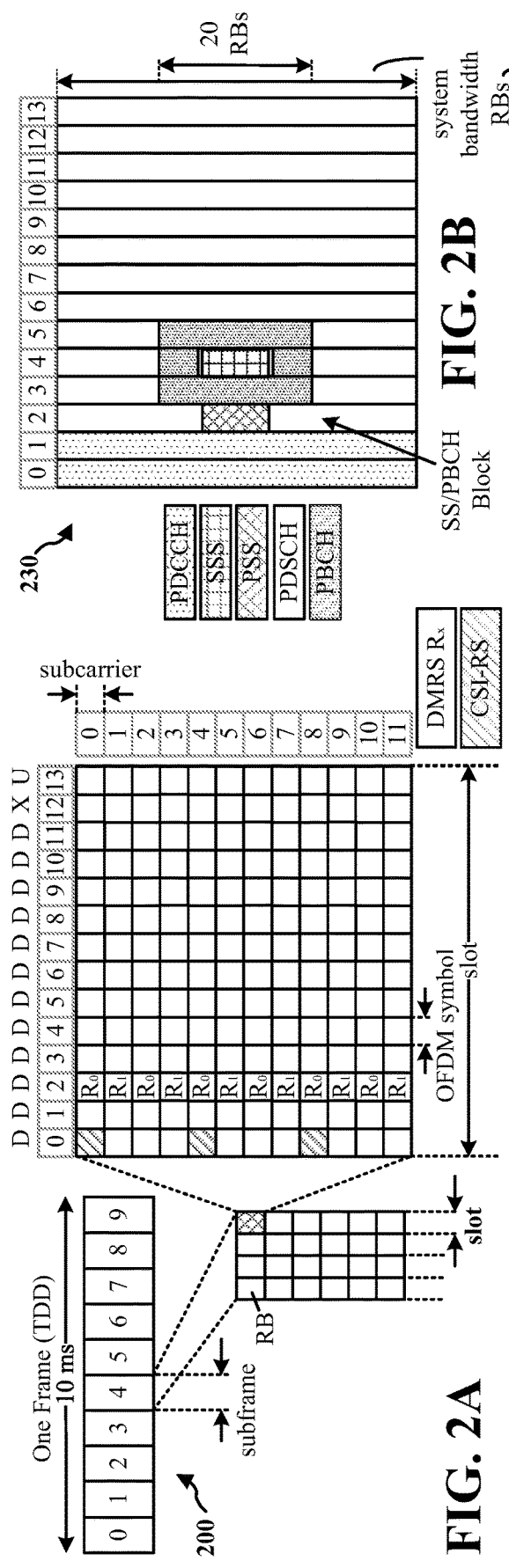
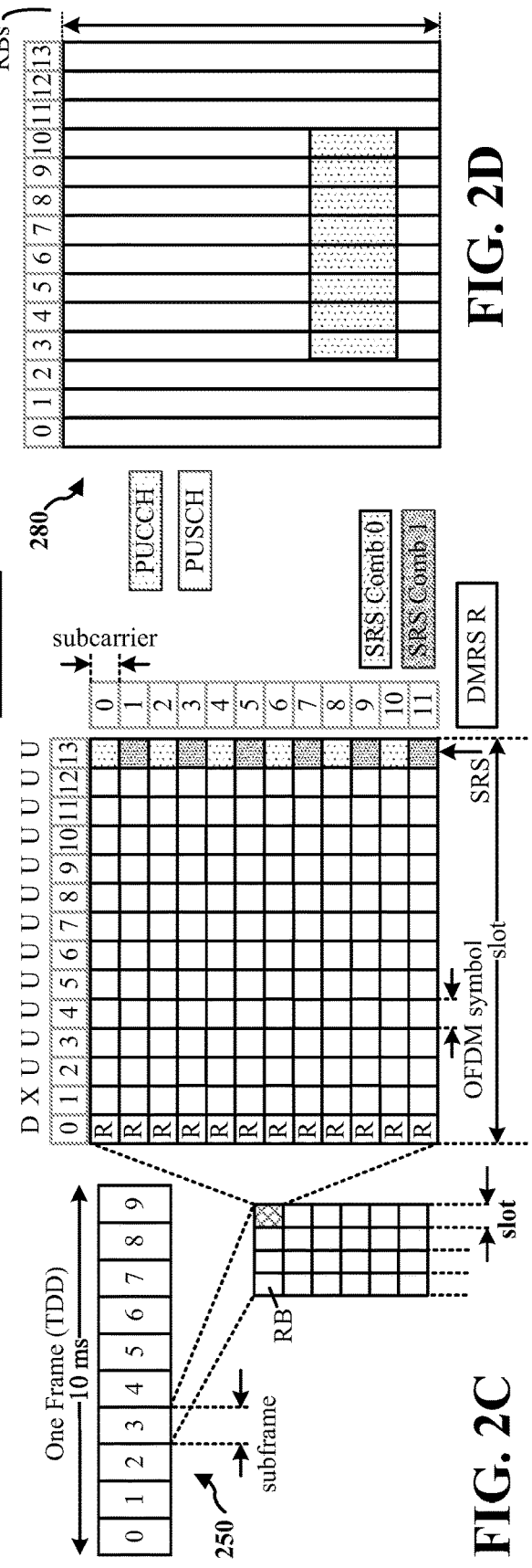
FIG. 2A  FIG. 2B  FIG. 2C  FIG. 2D

1000

```
┌─────────────────────────────────────────────────────────────────┐
│ Identify one or more active interference cancellation (AIC)      │
│ parameters for a user equipment (UE) camped on a network based   │
│ on resource scheduling information associated with a plurality   │
│ of UEs                                                           │
│                            1010                                  │
└─────────────────────────────────────────────────────────────────┘
                                 │
                                 ▼
┌─────────────────────────────────────────────────────────────────┐
│ Transmit, to the UE, physical layer random-access channel        │
│ (PRACH) configuration information including the one or more      │
│ active interference cancellation (AIC) parameters for            │
│ application of AIC to a PRACH message                            │
│                            1020                                  │
└─────────────────────────────────────────────────────────────────┘
```

```
┌─────────────────────────────────────────────────────────────────────┐
│  Receive, from a base station, physical layer random-access channel │
│  (PRACH) configuration information including one or more active     │
│  interference cancellation (AIC) parameters for applying AIC to a   │
│  PRACH message to the base station                                  │
│                              1110                                    │
└─────────────────────────────────────────────────────────────────────┘
                                  │
                                  ▼
┌─────────────────────────────────────────────────────────────────────┐
│  Transmit, to the base station, the PRACH message with one or more  │
│  AIC subcarriers based on the one or more AIC parameters            │
│                              1120                                    │
└─────────────────────────────────────────────────────────────────────┘
```

FIG. 11

ACTIVE INTERFERENCE CANCELLATION FOR RANDOM-ACCESS CHANNEL

BACKGROUND

Technical Field

The present disclosure relates generally to wireless communication, and more particularly, implementing active interference cancellation (AIC) for random-access channel (RACH).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method of wireless communication at a user equipment (UE) comprising receiving, from a base station, physical layer random-access channel (PRACH) configuration information including one or more active interference cancellation (AIC) parameters for applying AIC to a PRACH message to the base station. The method may further include transmitting, to the base station, the PRACH message with one or more AIC subcarriers based on the one or more AIC parameters.

The disclosure also provides an apparatus (e.g., a UE) including a memory storing computer-executable instructions and at least one processor configured to execute the computer-executable instructions to receive, from a base station, physical layer random-access channel (PRACH) configuration information including one or more active interference cancellation (AIC) parameters for applying AIC to a PRACH message to the base station and transmit, to the base station, the PRACH message with one or more AIC subcarriers based on the one or more AIC parameters. In addition, the disclosure also provides an apparatus including means for performing the above method, and a non-transitory computer-readable medium storing computer-executable instructions for performing the above method.

An example implementation includes a method of wireless communication at a base station comprising identifying one or more active interference cancellation (AIC) parameters for a user equipment (UE) camped on a network based on resource scheduling information associated with a plurality of UEs. The method may further comprise transmitting, to the UE, physical layer random-access channel (PRACH) configuration information including the one or more active interference cancellation (AIC) parameters for application of AIC to a PRACH message.

The disclosure also provides an apparatus (e.g., a base station) including a memory storing computer-executable instructions and at least one processor configured to execute the computer-executable instructions to identify one or more active interference cancellation (AIC) parameters for a user equipment (UE) camped on a network based on resource scheduling information associated with a plurality of UEs and transmit, to the UE, physical layer random-access channel (PRACH) configuration information including the one or more active interference cancellation (AIC) parameters for application of AIC to a PRACH message. In addition, the disclosure also provides an apparatus including means for performing the above method, and a non-transitory computer-readable medium storing computer-executable instructions for performing the above method.

To the accomplishment of the foregoing and related ends, the one or more aspects include the features hereinafter fully described and particularly pointed out in the claims. The following description and the annexed drawings set forth in detail some illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first 5G/NR frame, in accordance with some aspects of the present disclosure.

FIG. 2B is a diagram illustrating an example of DL channels within a 5G/NR subframe, in accordance with some aspects of the present disclosure.

FIG. 2C is a diagram illustrating an example of a second 5G/NR frame, in accordance with some aspects of the present disclosure.

FIG. 2D is a diagram illustrating an example of UL channels within a 5G/NR subframe, in accordance with some aspects of the present disclosure.

FIG. 10 is a flowchart of an example method of implementing active interference cancellation for RACH at a UE, in accordance with some aspects of the present disclosure.

FIG. 11 is a flowchart of an example method of implementing active interference cancellation for RACH at a base station, in accordance with some aspects of the present disclosure.

DETAILED DESCRIPTION

Figure 1:
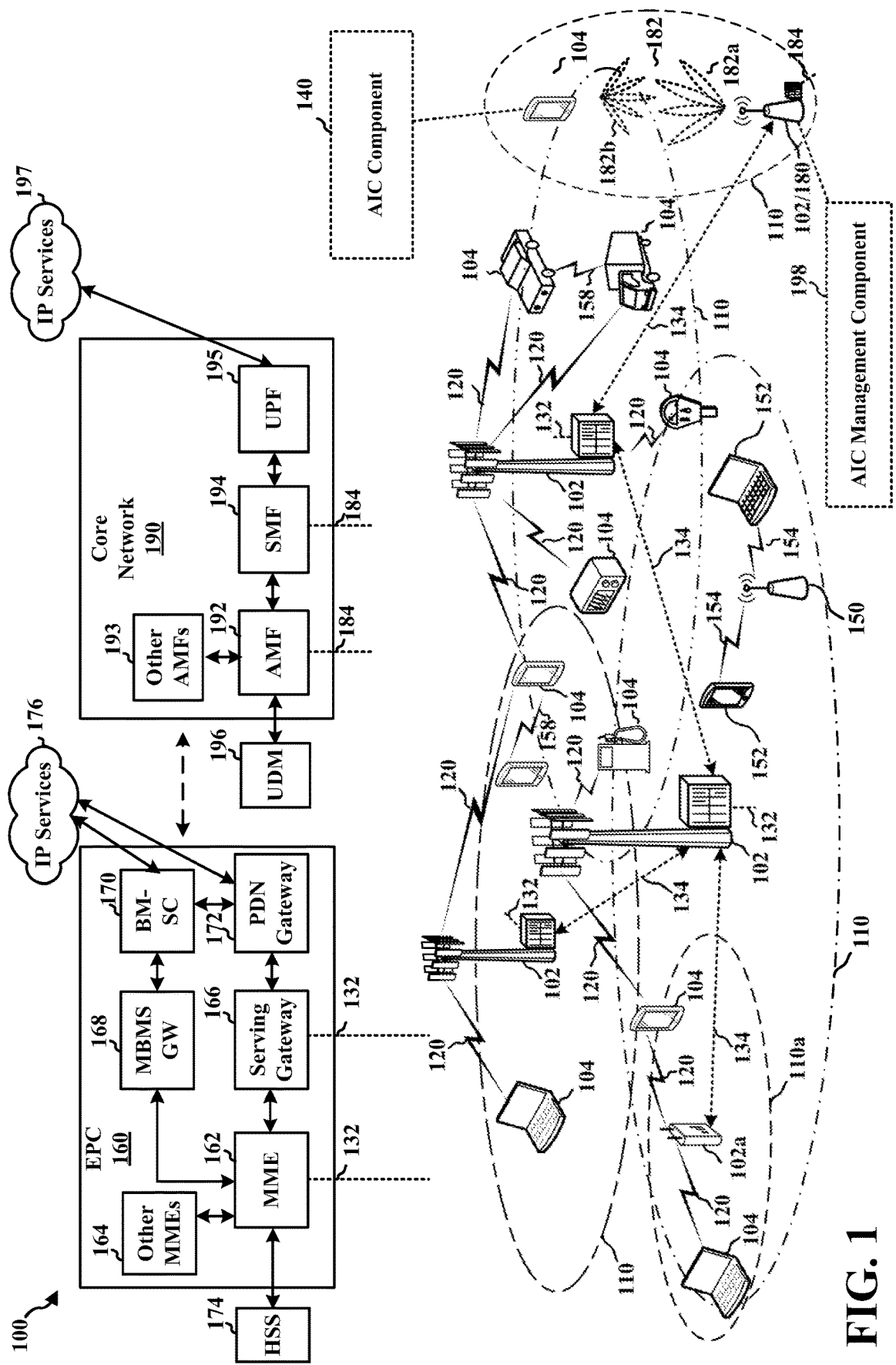
FIG. 1 is a diagram illustrating an example of a wireless communications system and an access network, in accordance with some aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to a person having ordinary skill in the art that these concepts may be practiced without these specific details. In some instances, structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Various implementations relate generally to a procedure for active interference cancellation for RACH. In some instances, use of orthogonal frequency-division multiplexing (OFDM) waveforms in 5G NR devices may result in interference due to the formation of sidelobes. As described in detail herein, a base station may determine configuration information defining AIC subcarriers capable of suppressing sidelobes resulting from activity by a UE that may be poorly synchronized to the base station and/or network during a RACH procedure, and transmit the configuration information to the UE to cause the UE to generate cancellation carriers for use during the transmission of RACH messages during a RACH procedure between the base station and the UE. Accordingly, in some aspects, a UE may be configured to implement AIC during a RACH procedure in order to generate AIC subcarriers that may suppress sidelobes capable of causing potentially disruptive levels of interference at other UEs.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (for example, a 5G Core (5GC)). The base stations 102 may include macrocells (high power cellular base station) or small cells (low power cellular base station). The macrocells include base stations. The small cells include femtocells, picocells, and microcells.

In an aspect, a base station 102 may include an active interference cancellation (AIC) management component 198 configured to periodically determine AIC parameters for PRACH messages received from UEs 104 based on resource scheduling information and transmit the AIC parameters within PRACH configuration information to the UEs 104 to be used to reduce interference at other UEs 104 during a PRACH procedure performed between the base station 102 and the UEs 104. Further, in an aspect, a UE 104 may include a AIC component 140 configured to receive PRACH configuration information from a base station 102, and apply one or more AIC parameters included in the PRACH configuration information to communications transmitting to the base station 102 during a PRACH procedure, e.g., a two-step PRACH procedure or a four-step PRACH procedure.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (for example, an S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (for example, handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (for example, through the EPC 160 or core network 190) with each other over third backhaul links 134 (for example, X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102a may have a coverage area 110a that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (for example, 5, 10, 15, 20, 100, 400 MHz, among other examples) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (for example, more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102a may operate in a licensed or an unlicensed frequency spectrum. When operating in an unlicensed frequency spectrum, the small cell 102a may employ NR and use the same 5 GHz unlicensed frequency spectrum as used by the Wi-Fi AP 150. The small cell 102a, employing NR in an unlicensed frequency spectrum, may boost coverage to or increase capacity of the access network.

A base station 102, whether a small cell 102a or a large cell (for example, macro base station), may include or be referred to as an eNB, gNodeB (gNB), or another type of base station. Some base stations, such as gNB 180 may operate in one or more frequency bands within the electromagnetic spectrum. The electromagnetic spectrum is often subdivided, based on frequency/wavelength, into various classes, bands, channels, etc. In 5G NR two initial operating bands have been identified as frequency range designations FR1 (416 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range. The base station 180 and the UE 104 may each include a plurality of antennas, such as antenna elements, antenna panels, or antenna arrays to facilitate the beamforming.

The base station 180 may transmit a beamformed signal to the UE 104 in one or more transmit directions 182*a*. The UE 104 may receive the beamformed signal from the base station 180 in one or more receive directions 182*b*. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a satellite phone, a cellular phone, a smart phone, a session initiation protocol (SIP) phone, a laptop, a personal digital assistant (PDA), a satellite radio, a global positioning system, a multimedia device, a video device, a digital audio player (for example, MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (for example, parking meter, gas pump, toaster, vehicles, heart monitor, among other examples). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

FIGS. 2A-2D include example diagrams 200, 230, 250, and 280 illustrating examples structures that may be used for wireless communication by the base station 102 and the UE 104, e.g., for 5G NR communication. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description presented herein applies also to a 5G/NR frame structure that is TDD.

Other wireless communication technologies may have a different frame structure or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 5 allow for 1, 2, 4, 8, 16, and 32 slots, respectively, per subframe. For slot configuration 1, different numerologies 0 to 2 allow for 2, 4, and 8 slots, respectively, per subframe. For slot configuration 0 and numerology µ, there are 14 symbols/slot and 2µ slots/subframe. The subcarrier spacing and symbol length/duration are a function of the numerology. The subcarrier spacing may be equal to $2^\mu*15$ kHz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more CCE, each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
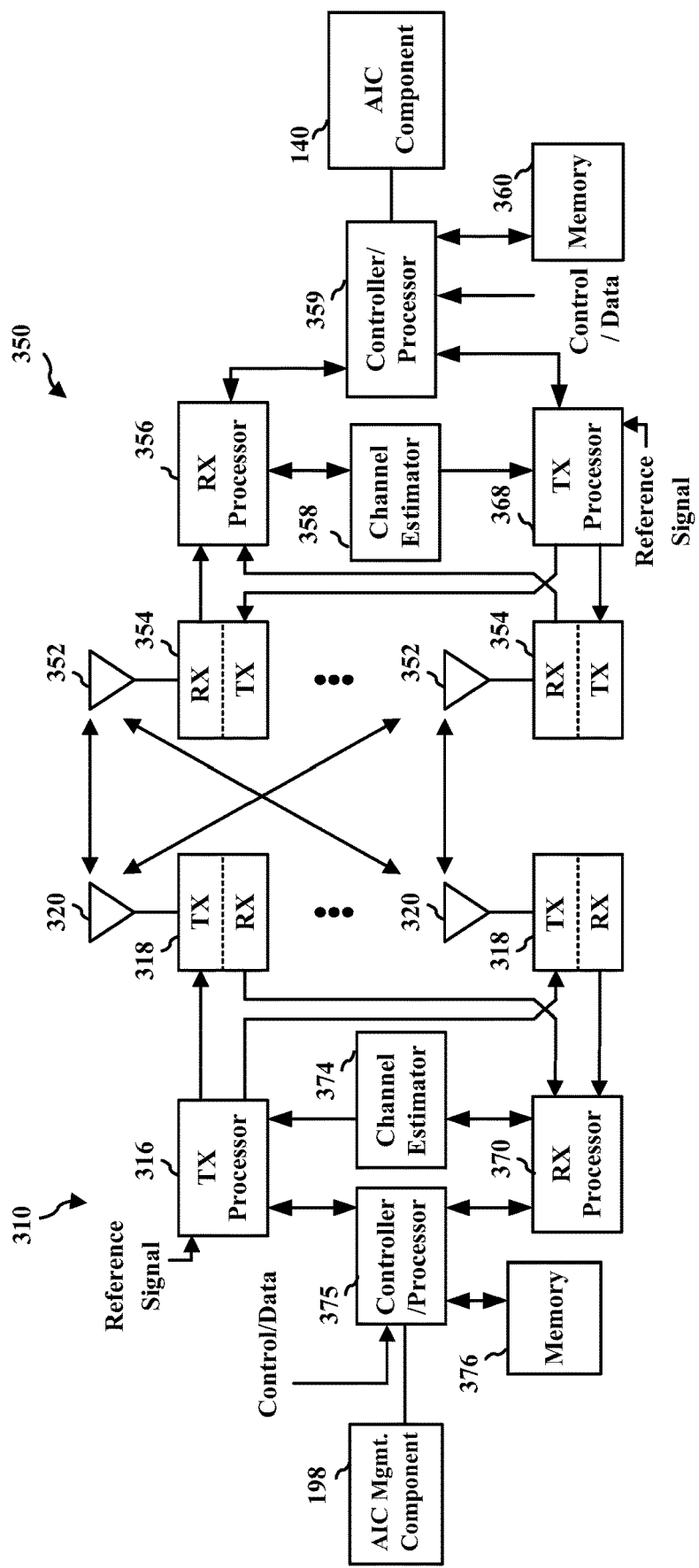
FIG. 3 is a diagram illustrating an example of a base station and a UE in an access network, in accordance with some aspects of the present disclosure.

FIG. 3 is a block diagram of a base station 102/180 in communication with a UE 104 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot) in the time or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 102/180. These soft decisions may be based on channel estimates computed by the channel estimator 358. The soft decisions are then decoded and deinterleaved to recover the data and control signals that were originally transmitted by the base station 102/180 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 102/180, the controller/processor 359 provides RRC layer functionality associated with system information (for example, MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102/180 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 102/180 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK or NACK protocol to support HARQ operations.

In the UE 104, at least one of the TX processor 368, the RX processor 356, and the controller/processor 359 may be configured to perform aspects in connection with the AIC component 140 of FIG. 1.

In the base station 102/180, at least one of the TX processor 316, the RX processor 370, and the controller/processor 375 may be configured to perform aspects in connection with AIC management component 198 of FIG. 1.

OFDM systems have gained popularity lately due to their high spectral efficiency and robustness. However, one of the drawbacks of OFDM is the high out-of-band radiation caused by the high sidelobes of the OFDM transmission signal. As described herein, in some aspect, a sidelobe may refer to a lobe (local maxima) of a far field radiation pattern of an antenna or other radiation source that is not the main lobe. Further, a sidelobe caused by a UE may cause interference at other UEs or subcarriers when the UE is not sufficiently synchronized in the time domain or frequency domain. In some systems, AIC may be employed to reduce or mitigate interference caused by sidelobes. In an AIC implementation, a UE may use some of the available subcarriers to cancel out the sidelobe generated by the UE. In some instances, carefully selecting the positions of the cancellation subcarriers and symbols modulated on the cancellation subcarriers may suppress OFDM sidelobes significantly in comparison to compared to a conventional system that does not utilize AIC.

Often during performance of a RACH procedure between a UE and a base station, the UE is not sufficiently synchronized in the time domain or frequency domain, thereby causing sidelobes capable of producing disruptive levels of interference at least at other UEs or to a gNB's reception of other UE's signals. The present disclosure provides techniques for implementing AIC for RACH. As described in detail above, a base station may determine AIC parameters defining AIC subcarriers, and transmit the AIC parameters within RACH configuration information to a UE that will employ the AIC parameters to generate AIC subcarriers that will reduce sidelobe interference resulting from a RACH procedure. As a result, the present disclosure reduces interference caused by lack of synchronicity during a RACH procedure, thereby improving network reliability and reducing power consumption.

Referring to FIGS. 4-8, in one non-limiting aspect, a system 400 is configured to facilitate AIC during RACH, in accordance with some aspects of the present disclosure.

Figure 4:
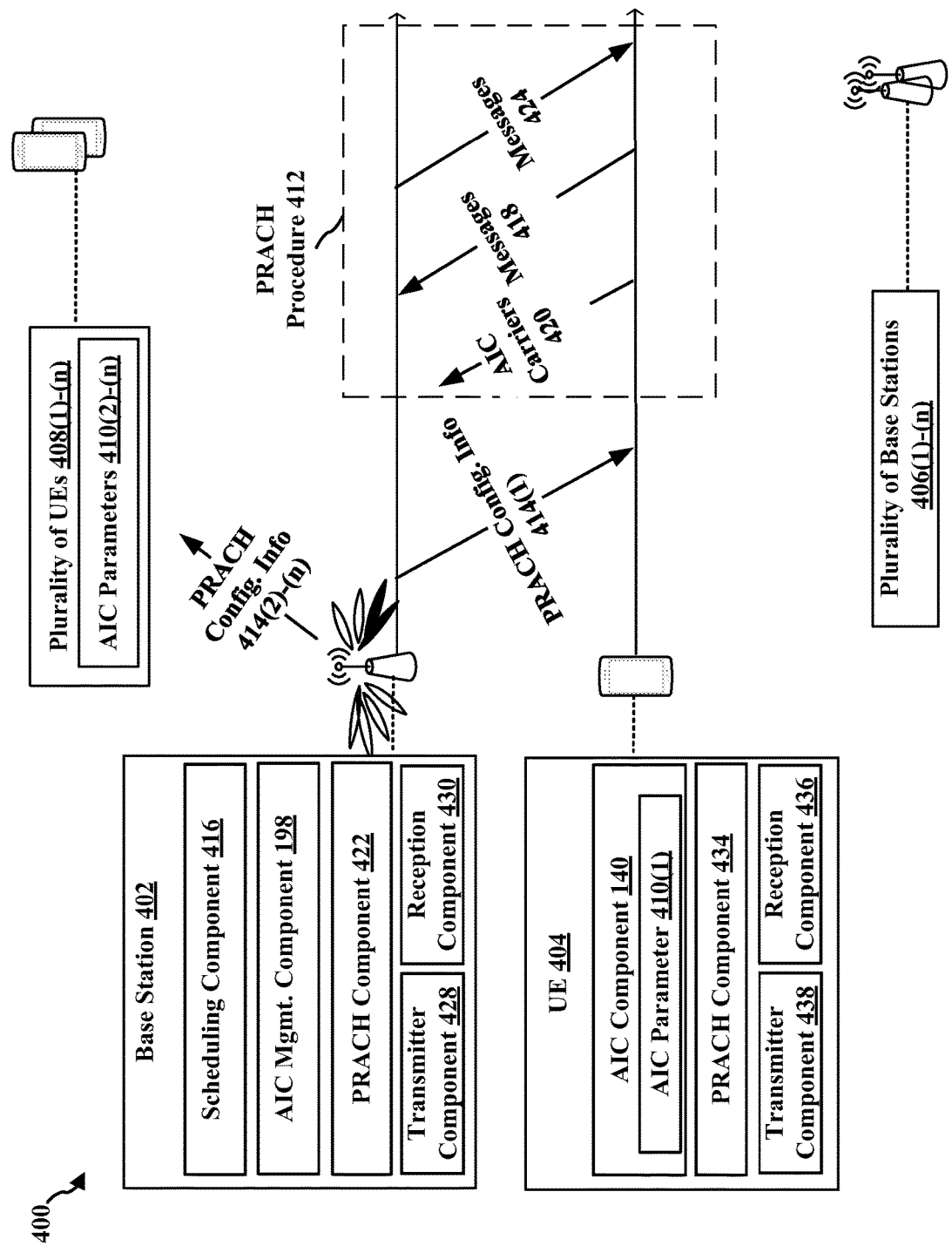
FIG. 4 is a diagram illustrating an example of communications of a base station and a UE, in accordance with some aspects of the present disclosure.

FIG. 4 is a diagram illustrating example communications and components of base stations and UEs. As illustrated in FIG. 4, the system 400 may include a base station 402 (e.g., the base station 102/180) serving a UE 404 (e.g., the UE 104). Further, the system 400 may include one or more other base stations 406 and one or more other UEs 408 configured to perform similar operations as the base station 402 and the UE 404, respectively. Further, the base station 402 and the UE 404 may be configured for beamformed wireless communications. For example, the base station 402 may exchange downlink transmissions and uplink transmissions with the UE 404 using directional transmit and receive beams, where each beam has an associated beam ID, beam direction, beam symbols, etc. Further, as described in detail herein, the base station 402, the UE 404, the base stations 406, and/or the UEs 408 may employ OFDM waveforms for uplink transmissions, downlink transmissions, and sidelink transmissions. In some instances, OFDM waveforms may exhibit high sidelobes in the frequency domain that may cause interference issues.

As illustrated in FIG. 4, the base station 402 may include the AIC management component 198 configured to determine AIC parameters 410(1)-(n) for the UEs 404 and 408 to reduce the effects of sidelobe interference when performing a PRACH procedure 412 with the base station 402, and transmit PRACH configuration information 414(1)-(n) including the AIC parameters 410(1)-(n) to the UEs 404 and 408. For example, the AIC management component 198 may determine one or more AIC parameters 410(1) for use by the UE 404 when performing a PRACH procedure 412 with the base station 402, and transmit the PRACH configuration information 414(1) to the UE 404. As an example, the base station 402 may transmit the PRACH configuration information 414(1) to the UE 404 via the PDCCH, a MAC-control element (CE), or a RRC message.

Further, the base station 402 may include a scheduling component 416 configured to periodically determine a sequence of time-frequency resource assignments for the UEs 404 and 408. In some aspects, the AIC management component 198 may generate the AIC parameters 410(1)-(n) based on the time-frequency resource assignments. For example, the AIC management component 198 may determine the AIC parameters 410(1) that will suppress side lobe interference caused by messages 418 transmitted by the UE 404 during the PRACH procedure 412 in view of time-frequency resource utilization by the other UEs 408. The one or more AIC parameters 410 may include the number of AIC subcarriers 420 employed by a UE (e.g., the UE 404, the UEs 408, etc.), a position of the AIC subcarriers 420, the symbols modulated on the AIC subcarriers 420 employed by a UE (e.g., the UE 404, the UEs 408, etc.), and/or a power level of the AIC subcarriers 420. In some examples, the power level may be relative to the data of the related message, e.g., a power level equal to the power level of the data, a power level three decibel (dB) less than the power level of the data, or a power level three dB more than the power level of the data. Further, in some aspects, the base station 402 may determine historic performance of the AIC management component 198 based on at least one of time-frequency resource utilization, measurement information, and/or reporting information, and employ machine learning and/or pattern recognition techniques to identify the AIC parameters 410 based on the historic performance.

In addition, the base station 402 may include a PRACH component 422 configured to perform a PRACH procedure 412 with the UEs 404 and 408 in order for the UEs 404 and 408 to acquire uplink synchronization and identifier information for radio access communication via the base station 402. As illustrated in FIG. 4, the UE 404 may transmit the one or more messages 418 during the PRACH procedure 412 to the base station 402, and the base station 402 may transmit one or more messages 424 to the UE 404 during the PRACH procedure 412. In some aspects, the PRACH procedure 412 may be a four-step PRACH procedure (i.e., type-1 random access procedure) between the base station 402 and the UE 404, as described in detail in FIGS. 7A-B. For example, a four-step PRACH procedure may include the base station 402 receiving a first message (i.e., Msg1) including a random access preamble from the UE 404, and transmitting a second message (i.e., Msg2) including a random access response to the UE 404. The four-step PRACH procedure may further include the base station 402 receiving a scheduled third message (i.e., Msg3) from the UE 404, and transmit a fourth message (i.e., Msg4) including contention resolution to the UE 404. In some other aspects, the PRACH procedure 412 may be two-step PRACH procedure (i.e., type-2 random access procedure) between the base station 402 and the UE 404, as described in detail in FIGS. 7C-D. For example, a two-step PRACH procedure may include the base station 402 receiving a first message (MsgA) including a random access preamble and a MsgA-PUSCH transmission from the UE 404, and transmitting a second message (MsgB) including a random access response to the UE 404. As described in detail herein, the UE 404 may apply AIC to transmission of the Msg1, Msg3, and/or MsgA to the base station 402.

In some aspects, the base station 402 may transmit PRACH configuration information 414 including a PRACH preamble and corresponding occasion information scheduling transmission of the PRACH message, and the PRACH configuration information 414 may configure the UE 404 to transmit Msg1 (i.e., the PRACH message) with the AIC subcarriers 420 based on the one or more AIC parameters 410. In some aspects, the PRACH preambles and PRACH occasions may be configured in RACH-ConfigCommon. Further, the base station 402 may transmit the PRACH configuration information 414 via a system information block #1 (SIB1) or dedicated signalling. In another aspect, the base station 402 may transmit the PRACH configuration information 414 via the PDCCH, and the PDCCH may schedule transmission of the Msg3 by the UE 404 to the base station 402 with the AIC subcarriers based on the one or more AIC parameters 410. In some aspects, although the Msg3 is scheduled with a timing advance (TA) command in a MAC-CE, the TA command may be inaccurate, thereby necessitating application of AIC as described herein. Further, in some examples, the PDCCH may contain bit fields indicating pre-configured AIC patterns for the one or more AIC parameters 410, e.g., no AIC, AIC with 1, 2, or 4 AIC subcarriers 420, etc.). In yet still another aspect, the base station 402 may transmit the PRACH configuration information 414 via a msgA-PUSCH-config message, and the msgA-PUSCH-config message may configure the UE 404 to transmit a TA-free PUSCH message to the base station 402 with the AIC subcarriers 420 based on the one or more AIC parameters 410. Further, the AIC parameters 410 may be defined for each SCS configuration, and/or frequency location of the PUSCH relative to carrier.

In addition, the base station 402 may include a reception component 428 and a transmitter component 430. The reception component 428 may include, for example, a radio frequency (RF) receiver for receiving the signals described herein. The transmitter component 430 may include, for example, an RF transmitter for transmitting the signals described herein. In an aspect, the reception component 428 and the transmitter component 430 may be co-located in a transceiver (e.g., the transceiver 810 shown in FIG. 8).

As illustrated in FIG. 4, the UE 404 may include the AIC component 140 configured to generate AIC subcarriers 420 based on the PRACH configuration information 414. For example, the AIC component 140 may be configured to receive the PRACH configuration information 414 from the base station 402, identify the applicable one or more AIC parameters 410(1) within the PRACH configuration information 414, and cause transmission of the AIC subcarriers 420 based on the one or more AIC parameters 410(1) during the PRACH procedure 412. In some aspects, the PRACH configuration information 414 may include different one or more AIC parameters 410 for each SCS configuration or frequency location of the PUSCH relative to carrier.

Figure 7C:
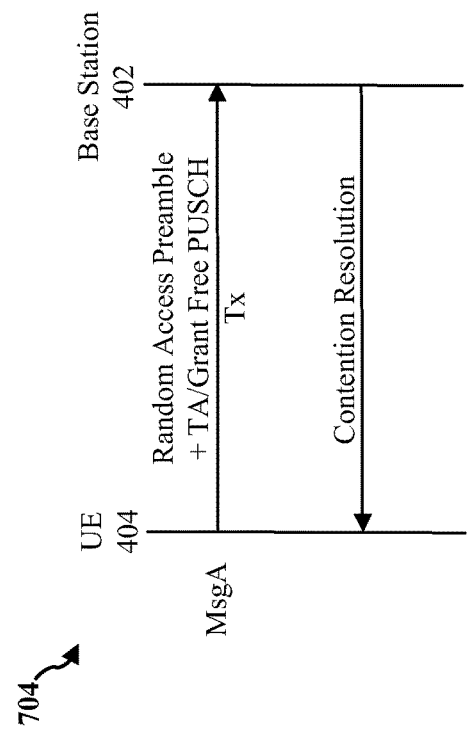
FIG. 7C is a diagram illustrating contention-based two-step random access, in accordance with some aspects of the present disclosure.
Figure 7D:
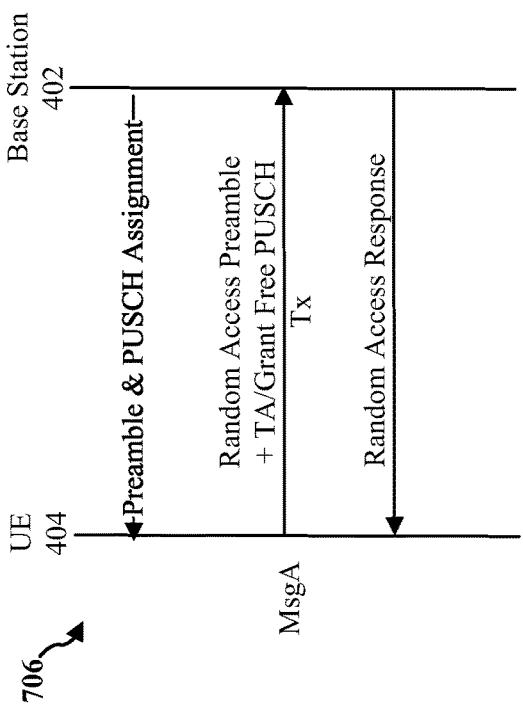
FIG. 7D is a diagram illustrating contention-free two-step random access, in accordance with some aspects of the present disclosure.
Figure 7A:
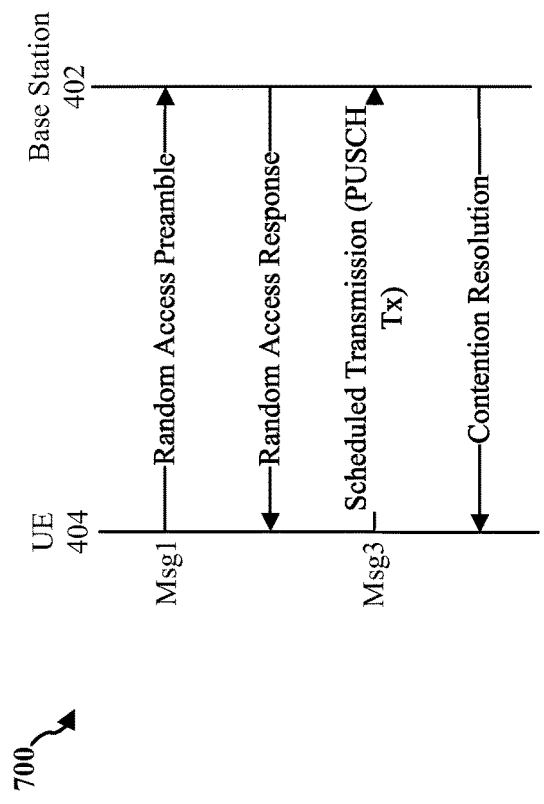
FIG. 7A is a diagram illustrating contention-based four-step random access, in accordance with some aspects of the present disclosure.
Figure 7B:
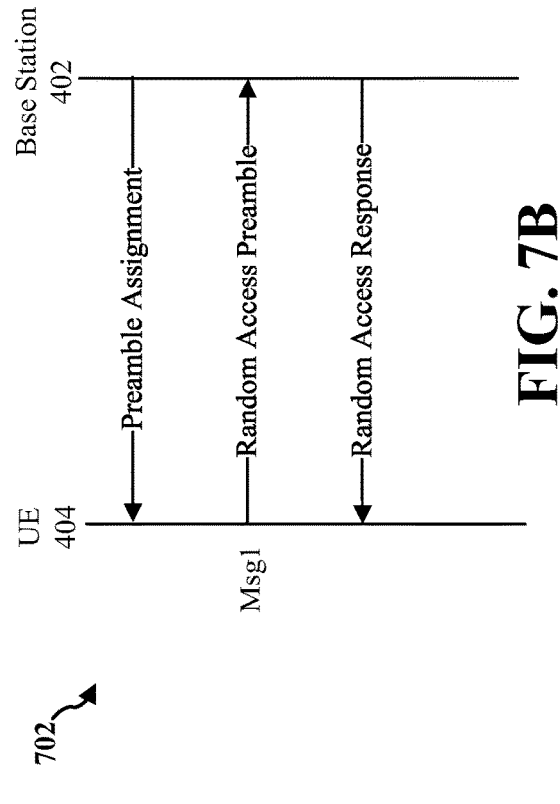
FIG. 7B is a diagram illustrating contention-free four-step random access, in accordance with some aspects of the present disclosure.

In addition, the UE 404 may include a PRACH component 434 configured to perform a PRACH procedure with the base stations 402 and 406 in order to acquire uplink synchronization and identifier information for radio access communication via the base stations 402 and 406. For example, as illustrated in FIG. 4, the UE 404 may transmit one or more messages 418 during the PRACH procedure 412 to the base station 402, and the base station 402 may transmit one or more messages 424 to the UE 404 during the PRACH procedure 412. In some aspects, the PRACH procedure 412 may be a four-step PRACH procedure (i.e., type-1 random access procedure) between the base station 402 and the UE 404, as illustrated in FIGS. 7A-B. For example, a four-step PRACH procedure may include the UE 404 transmitting a first message (i.e., Msg1) including a random access preamble to the base station 402, and receiving a second message (i.e., Msg2) including a random access response from the base station 402. The four-step PRACH procedure may further include the UE 404 transmitting a scheduled third message (i.e., Msg3) to the base station 402, and receiving a fourth message (i.e., Msg4) including contention resolution from the base station 402. In some other aspects, the PRACH procedure 412 may be two-step PRACH procedure (i.e., type-2 random access procedure) between the base station 402 and the UE 404, as illustrated in FIGS. 7C-D. For example, a two-step PRACH procedure may include the UE 404 transmitting a first message (MsgA) including a random access preamble and a MsgA-PUSCH transmission to the base station 402, and receiving a second message (MsgB) including a random access response from the base station. Further, as described herein, the UE 404 may transmit Msg1 and/or Msg3 in a four-step PRACH procedure with the one or more AIC subcarriers 420 in accordance with the one or more AIC parameters 410(1), or MsgA in a two-step PRACH procedure with the one or more AIC subcarriers 420 in accordance with the one or more AIC parameters 410(1).

In addition, the UE 404 may include a reception component 436 and a transmitter component 438. The transmitter component 438 may be configured to generate signals for transmission operations as described herein. The transmitter component 438 may include, for example, a RF transmitter for transmitting the signals described herein. The reception component 436 may include, for example, a RF receiver for receiving the signals described herein. In an aspect, the reception component 436 and the transmitter component 438 may be co-located in a transceiver (e.g., the transceiver 910 shown in FIG. 9).

Figure 5A:
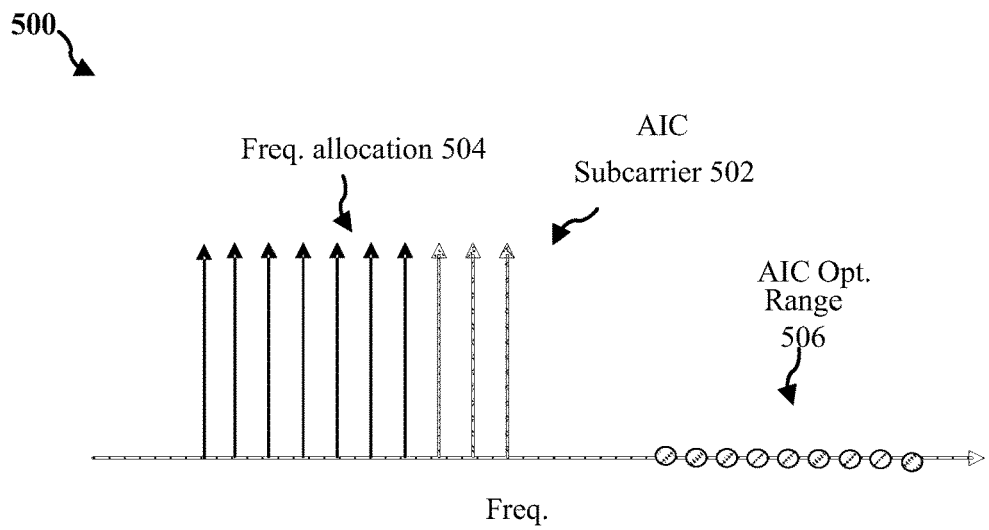
FIG. 5A is a diagram illustrating a first example of AIC, in accordance with some aspects of the present disclosure.
Figure 5B:
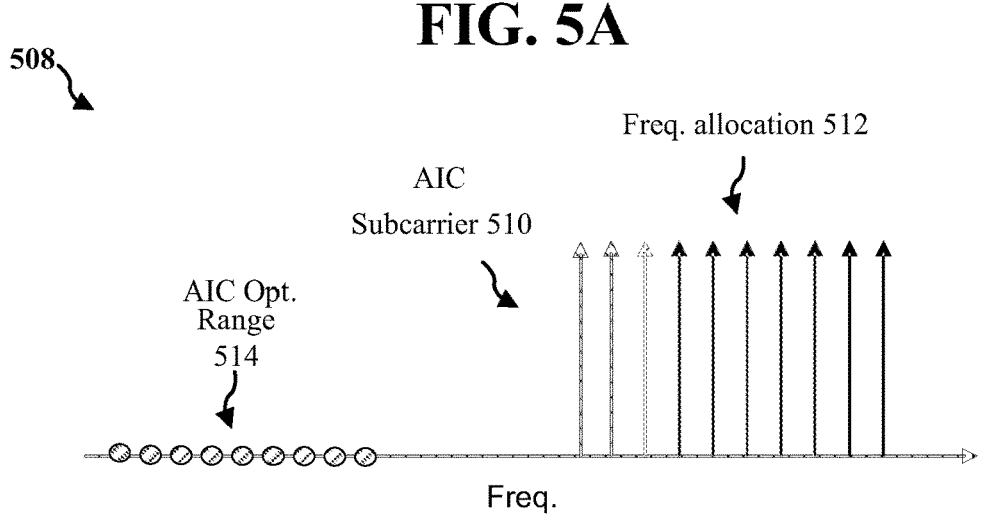
FIG. 5B is a diagram illustrating a second example of AIC, in accordance with some aspects of the present disclosure.
Figure 5C:
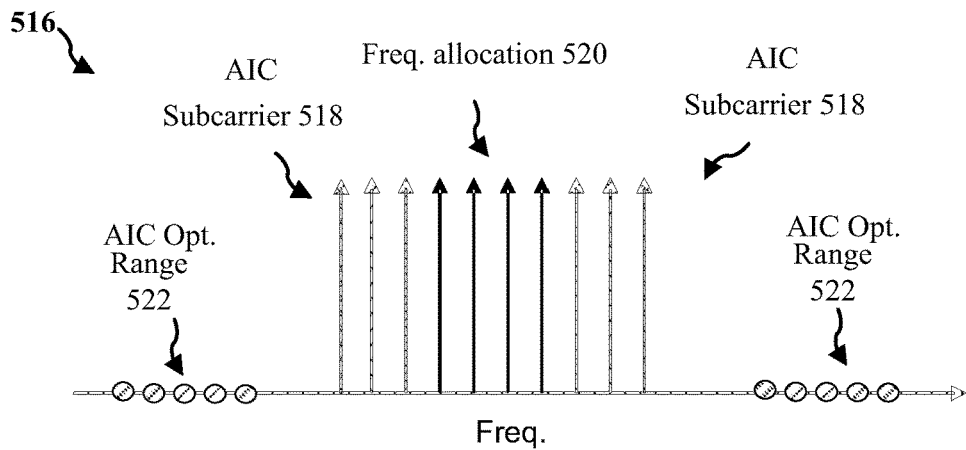
FIG. 5C is a diagram illustrating a third example of AIC, in accordance with some aspects of the present disclosure.

FIGS. 5A-5C illustrate examples of AIC, in accordance with some aspects of the present disclosure. For example, FIG. 5A illustrates a first example 500 of AIC subcarriers 502 positioned to the right of the allocated frequency 504 in order to mitigate high sidelobe within an optimization range 506. In some aspects, the one or more AIC parameters 410 may define at least the position of the AIC subcarriers 502 and the amount of AIC subcarriers 502. As another example, FIG. 5B illustrates a second example 508 of AIC subcarriers 510 positioned to the left of allocated frequency 512 in order to mitigate high sidelobe within an optimization range 514. In some aspects, the one or more AIC parameters 410 may define the position of the AIC subcarriers 510 and the amount of AIC subcarriers 510. As yet still another example, FIG. 5C illustrates a third example 516 of AIC subcarriers 518 positioned at the borders of allocated frequency 520 in order to mitigate high sidelobe within an optimization ranges 522(1)-(2). In some aspects, the one or more AIC parameters 410 may define the position of the AIC subcarriers 518 and the amount of AIC subcarriers 518.

Figure 6B:
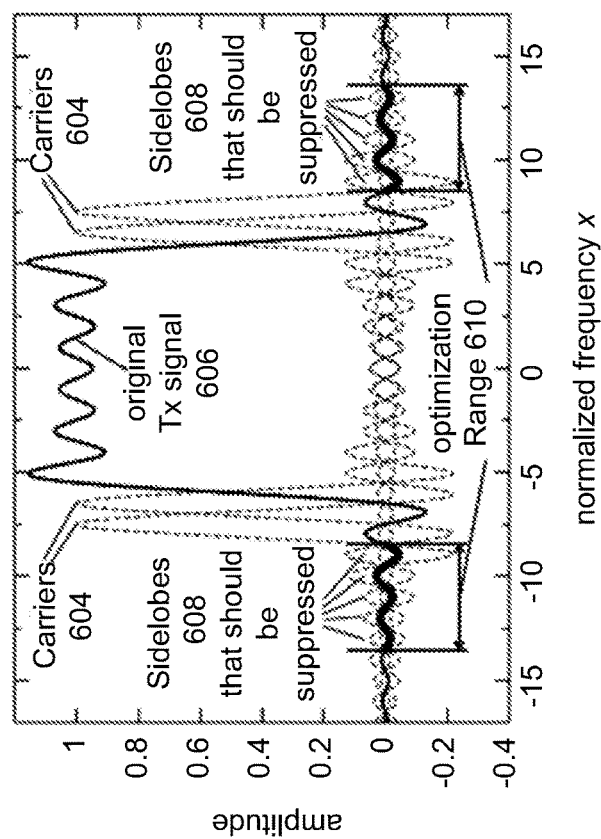
FIG. 6B is a diagram illustrating a fourth example of AIC, in accordance with some aspects of the present disclosure.
Figure 6A:
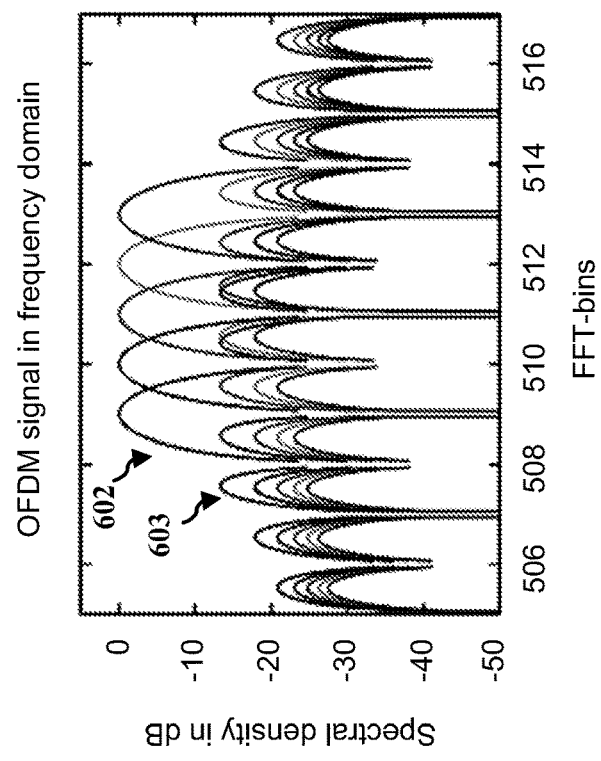
FIG. 6A is a diagram illustrating sidelobes formed by OFDM signals in the frequency domain, in accordance with some aspects of the present disclosure.

FIG. 6A is a diagram illustrating sidelobes formed by OFDM signals in the frequency domain, in accordance with some aspects of the present disclosure. As illustrated in FIG. 6A, an OFDM waveform 602 generated by a UE (e.g., the UE 404) may exhibit high sidelobe (e.g., sidelobe 603) in the frequency domain. Further, the high sidelobe may cause interference at one or more other UEs (e.g., the UEs 408). FIG. 6B is a diagram illustrating an example of AIC, in accordance with some aspects of the present disclosure. As illustrated in FIG. 6B, the application of the AIC subcarriers 604 with a transmission signal 606 may reduce the sidelobe 608 within an optimization range 610 below a threshold value.

FIG. 7A is a diagram illustrating contention-based four-step random access, in accordance with some aspects of the present disclosure. FIG. 7B is a diagram illustrating contention-free four-step random access, in accordance with some aspects of the present disclosure. FIG. 7C is a diagram illustrating contention-based two-step random access, in accordance with some aspects of the present disclosure. FIG. 7D is a diagram illustrating contention-free two-step random access, in accordance with some aspects of the present disclosure. Further, as described in detail herein, in some aspects, a UE 404 may apply AIC to messages 418 and 424 (e.g., Msg1, Msg3, MsgA) during a PRACH procedure 412 of FIGS. 7A-7D in accordance with PRACH configuration (e.g., the PRACH configuration information 414) received from the base station 402.

Figure 8:
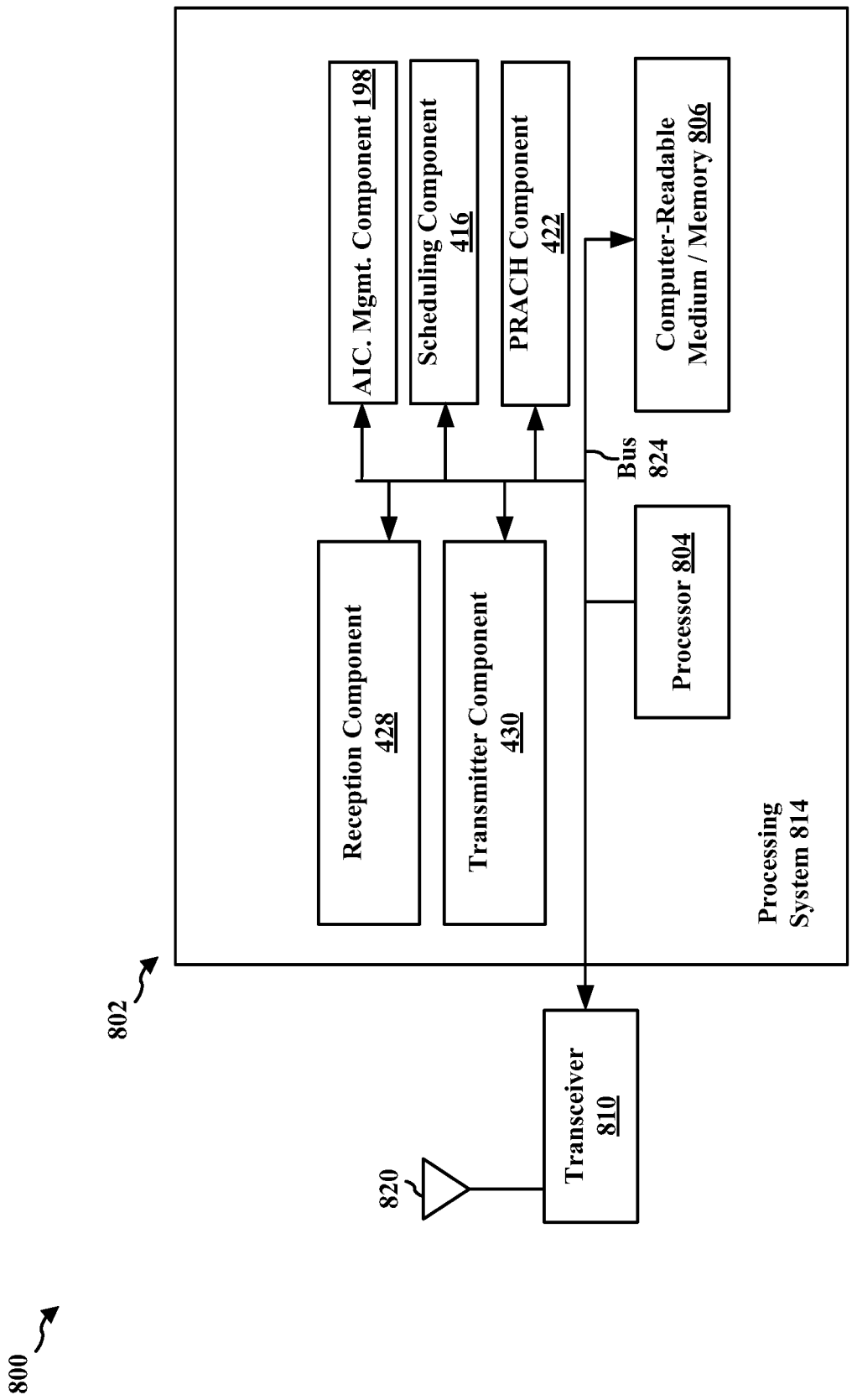
FIG. 8 is a diagram illustrating an example of a hardware implementation for a base station employing a processing system, in accordance with some aspects of the present disclosure.

FIG. 8 is a diagram 800 illustrating an example of a hardware implementation for a base station 802 employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the AIC management component 198, the scheduling component 416, the PRACH component 422, and the computer-readable medium/memory 806. The bus 824 may also link various other circuits such as timing sources, peripherals, voltage regulators, and power management circuits, which are well known in the art, and therefore, will not be described any further.

The processing system 814 may be coupled with a transceiver 810. The transceiver 810 is coupled with one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 428. The reception component 428 may receive the PRACH communications (i.e., the messages 418) and the AIC subcarriers 420 during the PRACH procedure 412. In addition, the transceiver 810 receives information from the processing system 814, specifically the transmitter component 430, and based on the received information, generates a signal to be applied to the one or more antennas 820. Further, the transmitter component 430 may send the PRACH configuration information 414, and the PRACH communications (i.e., the messages 424) during the PRACH procedure 412.

The processing system 814 includes a processor 804 coupled with a computer-readable medium/memory 806 (e.g., a non-transitory computer readable medium). The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the AIC management component 198, the scheduling component 416, or the PRACH component 422. The aforementioned components may be software components running in the processor 804, resident/stored in the computer readable medium/memory 806, one or more hardware components coupled with the processor 804, or some combination thereof. The processing system 814 may be a component of the base station 310 and may include the memory 376 and/or at least one of the TX processor 316, the RX processor 370, and the controller/processor 375. Alternatively, the processing system 814 may be the entire base station (e.g., see 310 of FIG. 3, base station 402 of FIG. 4).

The AIC management component 198 may be configured to determine AIC parameters for the UEs 404 and 408 to reduce the effects of sidelobe interference when performing a PRACH procedure with the base station 402, and transmit PRACH configuration information 414(1)-(n) including the AIC parameters 410(1)-(n) to the UEs 404 and 408. The scheduling component 416 configured to periodically determine time-frequency resource assignments for the UEs 404 and 408. Further, the PRACH component 422 may be configured to perform a PRACH procedure 412 with the UEs 404 and 408 in order for the UEs 404 and 408 to acquire uplink synchronization and identifier information for radio access communication via the base station 802.

The aforementioned means may be one or more of the aforementioned components of the base station 802 and/or the processing system 814 of the base station 802 configured to perform the functions recited by the aforementioned means. As described supra, the processing system 814 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 9:
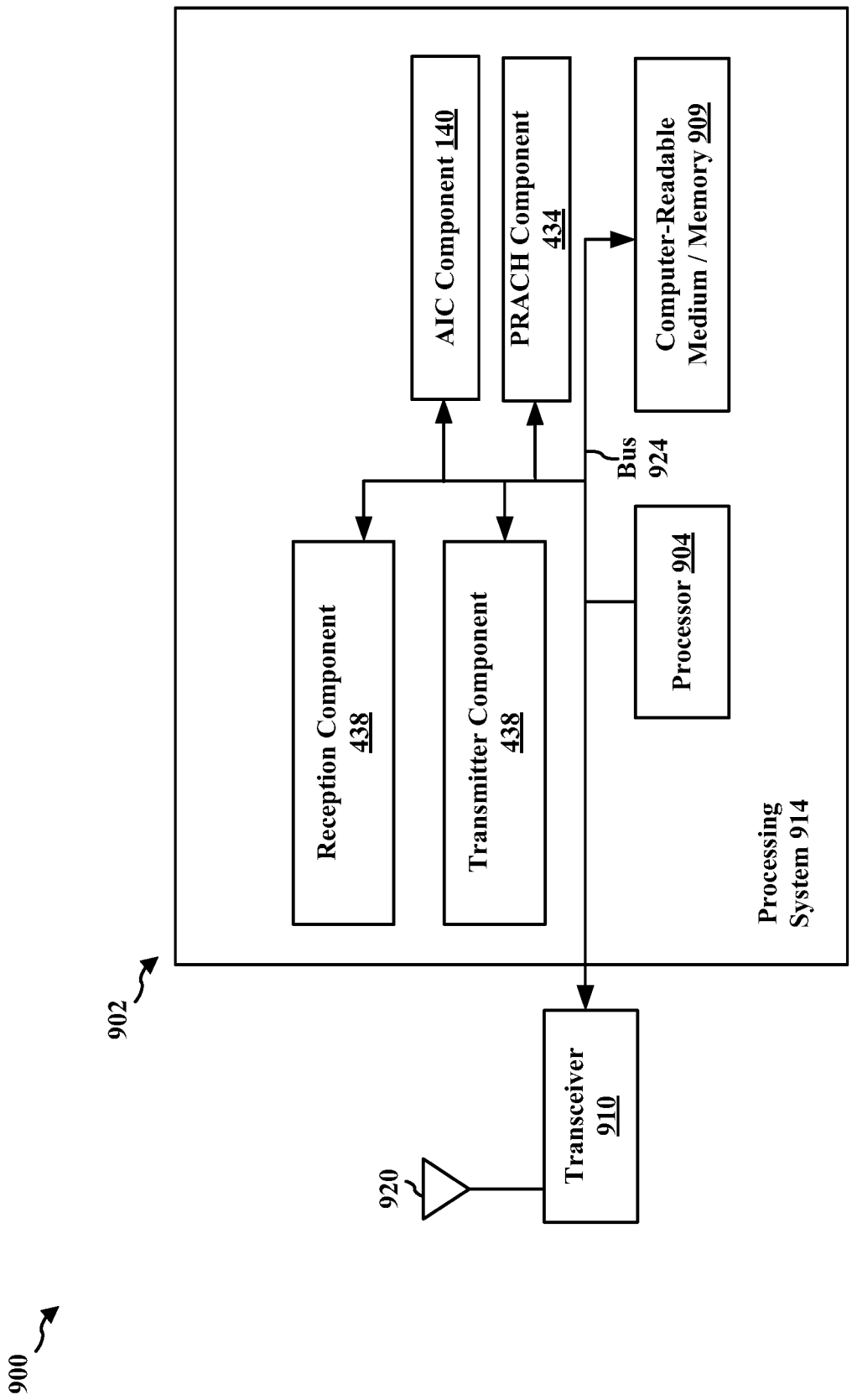
FIG. 9 is a diagram illustrating an example of a hardware implementation for a UE employing a processing system, in accordance with some aspects of the present disclosure.

FIG. 9 is a diagram 900 illustrating an example of a hardware implementation for a UE 902 (e.g., the UE 104, the UE 404, etc.) employing a processing system 914. The processing system 914 may be implemented with a bus architecture, represented generally by the bus 924. The bus 924 may include any number of interconnecting buses and/or bridges depending on the specific application of the processing system 914 and the overall design constraints. The bus 924 links together various circuits including one or more processors and/or hardware components, represented by the processor 904, the AIC component 140, the PRACH component 434, and the computer-readable medium (e.g., non-transitory computer-readable medium)/memory 906. The bus 924 may also link various other circuits such as timing sources, peripherals, voltage regulators, and power management circuits, which are well known in the art, and therefore, will not be described any further.

The processing system 914 may be coupled with a transceiver 910. The transceiver 910 may be coupled with one or more antennas 920. The transceiver 910 provides a means for communicating with various other apparatus over a transmission medium. The transceiver 910 receives a signal from the one or more antennas, extracts information from the received signal, and provides the extracted information to the processing system 914, specifically the reception component 436. The reception component 436 may receive the PRACH configuration information 414, and the PRACH communications (i.e., the messages 424) during the PRACH procedure 412. In addition, the transceiver 910 receives information from the processing system 914, specifically the transmitter component 438, and based on the received information, generates a signal to be applied to the one or more antennas. Further, the transmitter component 438 may transmit the PRACH communications (i.e., the messages 418) and the AIC subcarriers 420 during the PRACH procedure 412.

The processing system 914 includes a processor 904 coupled with a computer-readable medium/memory 906 (e.g., a non-transitory computer readable medium). The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the AIC component 140, or the PRACH component 434. The aforementioned components may be a software component running in the processor 904, resident/stored in the computer readable medium/memory 906, one or more hardware components coupled with the processor 904, or some combination thereof. The processing system 914 may be a component of the UE 390 and may include the memory 360 and/or at least one of the TX processor 368, the RX processor 356, and the controller/processor 359. Alternatively, the processing system 914 may be the entire UE (e.g., see 350 of FIG. 3, UE 404 of FIG. 4).

The AIC component 140 may be configured to generate AIC subcarriers 420 based on the PRACH configuration information 414. For example, the AIC component 140 may be configured to generate AIC subcarriers 420 based on the one or more AIC parameters 410(1) received from the base station 402. Further, the PRACH component 434 may be configured to perform a PRACH procedure with the base stations 402 and 406 in order to acquire uplink synchronization and identifier information for radio access communication via the base stations 402 and 406.

The aforementioned means may be one or more of the aforementioned components of the UE 902 and/or the processing system 914 of UE 902 configured to perform the functions recited by the aforementioned means. As described supra, the processing system 914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

FIG. 10 is a flowchart of a method 1000 of implementing active interference cancellation for RACH at a base station, in accordance with some aspects of the present disclosure. The method may be performed by a base station (e.g., the base station 102, which may include the memory 376 and which may be the entire base station or a component of the base station, such as AIC management component 198, the scheduling component 416 the PRACH component 422, the TX processor 316, the RX processor 370, and/or the controller/processor 375; the base station 402, the base station 802 of FIG. 8).

At block 1010, the method 1000 may include identifying one or more active interference cancellation (AIC) parameters for a UE camped on a network based on resource scheduling information associated with a plurality of UEs. For example, the AIC management component 198 may identify one or more AIC parameters 410 defining one or more AIC subcarriers 420 that may suppress the sidelobes resulting from transmission of the messages 418 during the PRACH procedure 412. In some aspects, the one or more AIC parameters 410 may define AIC subcarriers 420 that will suppress the interference caused by the sidelobes below a predefined threshold.

Accordingly, the base station 102, the TX processor 316, the RX processor 370, and/or the controller/processor 375 executing the AIC management component 198 may provide means for identifying one or more AIC parameters for a UE camped on a network based on resource scheduling information associated with a plurality of UEs.

At block 1020, the method 1000 may include transmitting, to the UE, physical layer random-access channel (PRACH) configuration information including the one or more AIC parameters for application of AIC to a PRACH message. For example, the AIC management component 198 may transmit the PRACH configuration information 414 including the AIC parameters 410(1) to the UE 404.

Accordingly, the base station 102, the RX processor 370, and/or the controller/processor 375 executing the AIC management component 198 may provide means for transmitting, to the UE, physical layer random-access channel (PRACH) configuration information including the one or more active interference cancellation (AIC) parameters for application of AIC to a PRACH message.

Additionally, or alternatively, in some aspects, the method 1000 may further include receiving, from the UE, the PRACH message with one or more AIC subcarriers based on the one or more AIC parameters. For example, the base station 402 may receive the messages 418 and the AIC subcarriers 420 from the UE 404, and the UE 404 may generate the AIC subcarriers 420 based on the AIC parameters 410(1) transmitted to the UE 404. Accordingly, the base station 102, the RX processor 370, and/or the controller/processor 375 executing the AIC management component 198 may provide means for receiving, from the UE, the PRACH message with one or more AIC subcarriers based on the one or more AIC parameters.

Additionally, or alternatively, in some aspects, to transmit the PRACH configuration information, the method 1000 may further include transmitting a PRACH preamble and corresponding occasion information that schedules transmission of the PRACH message, and wherein the PRACH message is the PRACH preamble in a PRACH procedure between the UE and the base station. For example, the base station 402 may transmit PRACH configuration information 414 including a PRACH preamble and corresponding occasion information that schedules transmission of a PRACH message including the PRACH preamble from the UE 404. Accordingly, the base station 102, the RX processor 370, and/or the controller/processor 375 executing the AIC management component 198 may provide means for transmitting a PRACH preamble and corresponding occasion information that schedules transmission of the PRACH message, and wherein the PRACH message is the PRACH preamble in a PRACH procedure between the UE and the base station. Further, in some aspects, to transmit the PRACH configuration information, the method 1000 may further include transmitting the PRACH preamble and corresponding occasion information via a SIB1 or dedicated signaling. For example, the base station 402 may transmit the PRACH configuration information 414 via a SIB1 or dedicated signaling. Accordingly, the base station 102, the RX processor 370, and/or the controller/processor 375 executing the AIC management component 198 may provide means for include transmitting the PRACH preamble and corresponding occasion information via SIB1 or dedicated signaling. Additionally, or alternatively, in some aspects, the one or more AIC parameters may include at least one of an amount of one or more AIC subcarriers to employ, a position of the one or more AIC subcarriers, or one or more symbols modulated on the one or more AIC subcarriers.

Additionally, or alternatively, in some aspects, the PRACH message is a PUSCH message transmitted between the UE and the base station in a PRACH procedure, and to transmit the PRACH configuration information, the method 1000 may further include transmitting the PRACH configuration information via a PDCCH, the PRACH configuration information scheduling transmission of the PUSCH message. For example, the base station 402 may transmit the PRACH configuration information 414 via a PDCCH. Accordingly, the base station 102, the RX processor 370, and/or the controller/processor 375 executing the AIC management component 198 may provide means transmitting the PRACH configuration information via a PDCCH, the PRACH configuration information scheduling transmission of the PUSCH message. Further, in some aspects, the PDCCH includes one or more bit fields indicating the one or more AIC parameters. In addition, in some aspects, the one or more AIC parameters include at least one of an amount of the one or more AIC subcarriers, a position of the one or more AIC subcarriers, or a power level of the one or more AIC subcarriers.

Further, in some aspects, the PRACH message is a timing advance free PUSCH message of a two-step PRACH procedure between the UE and the base station, and to transmit the PRACH configuration information, the method 1000 may further to transmitting the PRACH configuration information within a PUSCH configuration message. For example, the base station 402 may transmit the PRACH configuration information 414 within or as a PUSCH configuration message. Accordingly, the base station 102, the RX processor 370, and/or the controller/processor 375 executing the AIC management component 198 may provide means for include transmitting the PRACH configuration information within a physical uplink shared channel (PUSCH) configuration message. In addition, in some aspects, the one or more AIC parameters include at least one of an amount of the one or more AIC subcarriers, a position of the one or more AIC subcarriers, or a power level of the one or more AIC subcarriers. Additionally, in some aspects, the one or more AIC parameters are a first one or more AIC parameters, the PRACH information includes the first one or more AIC parameters for a first subcarrier spacing (SCS) carrier configuration or a first frequency location associated with a PUSCH and a second one or more AIC parameters for a second SCS carrier configuration or a second frequency location associated with the PUSCH, and the at least one processor is configured to determine to apply the first one or more AIC parameters based on application of the first SCS carrier configuration or the first frequency location associated with the PUSCH.

FIG. 11 is a flowchart of a method 1000 of implementing active interference cancellation for RACH at a UE, in accordance with some aspects of the present disclosure. The method may be performed by a UE (e.g., the UE 104 of FIGS. 1 and 3, which may include the memory 360 and which may be the entire UE 104 or a component of the UE 104, such as the AIC component 140, the PRACH component 434, the TX processor 368, the RX processor 356, and/or the controller/processor 359; the UE 404 of FIG. 4; and/or the UE 902 of FIG. 9).

At block 1110, the method 1100 may include receiving, from a base station, PRACH configuration information including one or more AIC parameters for applying AIC to a PRACH message to the base station. For example, the UE 404 may receive the PRACH configuration information 414 including the one or more AIC parameters 410 from the base station.

Accordingly, the UE 104, the UE 404, UE 902, the TX processor 368, the RX processor 356, and/or the controller/processor 359, executing the AIC component 140 may provide means for receiving, from a base station, PRACH configuration information including one or more AIC parameters for applying AIC to a PRACH message to the base station.

At block 1120, the method 1100 may include transmitting, to the base station, the PRACH message with one or more AIC subcarriers based on the one or more AIC parameters. For example, the UE 404 may transmit the messages 418 and the AIC subcarriers 420 to the base station 402 during the PRACH procedure 412. In some aspects, the AIC component 140 may generate the AIC subcarriers 420 based on the AIC parameters 410(1), and the AIC parameters 410(1) may configure the AIC subcarriers 420 to suppress the sidelobes resulting from transmission of the messages 418 during the PRACH procedure 412. In some aspects, the one or more AIC parameters 410 may define AIC subcarriers 420 that will suppress the interference caused by the sidelobes below a predefined threshold.

Accordingly, the UE 104, the UE 404, UE 902, the TX processor 368, the RX processor 356, and/or the controller/processor 359 executing the AIC component 140 and the PRACH component 434 may provide means for transmitting, to the base station, the PRACH message with one or more AIC subcarriers based on the one or more AIC parameters.

Additionally, or alternatively, in some aspects, the PRACH configuration information includes a PRACH preamble and corresponding occasion information scheduling transmission of the PRACH message, and the PRACH message is the PRACH preamble in a PRACH procedure between the UE and the base station. Further, in order to receive the PRACH configuration information, the method 1100 may include receiving the PRACH configuration information via a SIB1 or dedicated signaling. For example, the UE 404 may receive PRACH configuration information 414 including a PRACH preamble and corresponding occasion information that schedules transmission of a PRACH message including the PRACH preamble from the base station 402. Further, the base station 402 may transmit the PRACH configuration information 414 via a SIB1 or dedicated signaling. Accordingly, the UE 104, the UE 404, UE 902, the TX processor 368, the RX processor 356, and/or the controller/processor 359 executing the AIC component 140 may provide means for receiving the PRACH configuration information via a SIB1 or dedicated signaling. In addition, in some aspects, the one or more AIC parameters include at least one of an amount of the one or more AIC subcarriers, a position of the one or more AIC subcarriers, or a power level of the one or more AIC subcarriers.

Additionally, or alternatively, in some aspects, the PRACH configuration information is transmitted via a PDCCH and schedules transmission of the PRACH message, and the PRACH message is a PUSCH message transmitted from the UE to the base station in a PRACH procedure. For example, the UE 404 may receive the PRACH configuration information 414 from the base station 402 via a PDCCH message. Further, in some aspects, the PDCCH message may include one or more bit fields indicating the one or more AIC parameters. In addition, in some aspects, the one or more AIC parameters include at least one of an amount of the one or more AIC subcarriers, a position of the one or more AIC subcarriers, or a power level of the one or more AIC subcarriers.

Additionally, or alternatively, in some aspects, the PRACH configuration information is included in a PUSCH configuration message, and the PRACH message is a timing advance free PUSCH message of a two-step PRACH procedure between the UE and the base station. For example, the UE 404 may receive the PRACH configuration information 414 within or as a PUSCH configuration message from the base station 402. Further, in order to receive the PRACH configuration information, the method 1100 may include receiving the one or more AIC parameters via one or more RRC parameters of the PUSCH configuration message. Accordingly, the UE 104, the UE 404, UE 902, the TX processor 368, the RX processor 356, and/or the controller/processor 359 executing the AIC component 140 may provide means for receiving the one or more AIC parameters via one or more RRC parameters of the PUSCH configuration message. In addition, in some aspects, the one or more AIC parameters include at least one of an amount of the one or more AIC subcarriers, a position of the one or more AIC subcarriers, or a power level of the one or more AIC subcarriers. Additionally, in some aspects, the one or more AIC parameters are a first one or more AIC parameters, the PRACH information includes the first one or more AIC parameters for a first subcarrier spacing (SCS) carrier configuration or a first frequency location associated with a PUSCH and a second one or more AIC parameters for a second SCS carrier configuration or a second frequency location associated with the PUSCH, and the at least one processor is configured to determine to apply the first one or more AIC parameters based on application of the first SCS carrier configuration or the first frequency location associated with the PUSCH.

The specific order or hierarchy of blocks in the processes/flowcharts disclosed is an illustration of example approaches. Based upon design preferences, the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person having ordinary skill in the art to practice the various aspects described herein. Various modifications to these aspects will be readily apparent to a person having ordinary skill in the art, and the generic principles defined herein may be applied to other aspects. The claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to a person having ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Example Clauses

A. A method of wireless communication at a UE, comprising receive, from a base station, physical layer random-access channel (PRACH) configuration information including one or more active interference cancellation (AIC) parameters for applying AIC to a PRACH message to the base station; and transmit, to the base station, the PRACH message with one or more AIC subcarriers based on the one or more AIC parameters.

B. The method as paragraph A recites, wherein the PRACH configuration information includes a PRACH preamble and corresponding occasion information scheduling transmission of the PRACH message, and the PRACH message is the PRACH preamble in a PRACH procedure between the UE and the base station.

C. The method as paragraph B recites, wherein to receive the PRACH configuration information, the at least one processor is configured to receive the PRACH configuration information via a system information block #1 (SIB1) or dedicated signaling.

D. The method as paragraph B recites, wherein the one or more AIC parameters include at least one of an amount of the one or more AIC subcarriers, a position of the one or more AIC subcarriers, or one or more symbols modulated on the one or more AIC subcarriers.

E. The method as any of paragraphs A-D recite, wherein the PRACH configuration information is transmitted via a physical downlink control channel (PDCCH) and schedules transmission of the PRACH message, and the PRACH message is a physical uplink shared channel (PUSCH) message transmitted from the UE to the base station in a PRACH procedure.

F. The method as paragraph E recites, wherein the PDCCH includes one or more bit fields indicating the one or more AIC parameters.

G. The method as paragraph E recites, wherein the one or more AIC parameters include at least one of an amount of the one or more AIC subcarriers, a position of the one or more AIC subcarriers, or a power level of the one or more AIC subcarriers.

H. The method as any of paragraphs A-G recite, wherein the PRACH configuration information is included in a physical uplink shared channel (PUSCH) configuration message, and the PRACH message is a timing advance free PUSCH message of a two-step PRACH procedure between the UE and the base station.

I. The method as paragraph H recites, wherein to receive the PRACH configuration information, the at least one processor is configured to receive the one or more AIC parameters via one or more radio resource control (RRC) parameters of the PUSCH configuration message.

J. The method as paragraph H recites, wherein the one or more AIC parameters include at least one of an amount of the one or more AIC subcarriers, a position of the one or more AIC subcarriers, or a power level of the one or more AIC subcarriers.

K. The method as paragraph H recites, wherein the one or more AIC parameters are a first one or more AIC parameters, the PRACH information includes the first one or more AIC parameters for a first subcarrier spacing (SCS) carrier configuration or a first frequency location associated with a PUSCH and a second one or more AIC parameters for a second SCS carrier configuration or a second frequency location associated with the PUSCH, and the at least one processor is configured to determine to apply the first one or more AIC parameters based on application of the first SCS carrier configuration or the first frequency location associated with the PUSCH.

L. A UE for wireless communication, comprising a memory storing computer-executable instructions; and at least one processor coupled with the memory and configured to execute the computer-executable instructions to perform the method of any of paragraphs A-K.

M. A UE for wireless communication, comprising means for performing the method of any of paragraphs A-K.

N. A non-transitory computer-readable medium storing computer executable code, the code when executed by a processor causes the processor to perform the method of any of paragraphs A-K.

O. A method of wireless communication at a base station, comprising identify one or more active interference cancellation (AIC) parameters for a user equipment (UE) camped on a network based on resource scheduling information associated with a plurality of UEs; and transmit, to the UE, physical layer random-access channel (PRACH) configuration information including the one or more active interference cancellation (AIC) parameters for application of AIC to a PRACH message.

P. The method as paragraph O recites, wherein the at least one processor is configured to receive, from the UE, the PRACH message with one or more AIC subcarriers based on the one or more AIC parameters.

Q. The method as paragraph U recites, wherein transmitting the paging occasion configuration comprises transmitting a short message identifying the first paging PDCCH monitoring occasion and the second paging PDCCH monitoring occasion.

R. The method as any of paragraphs P-Q recite, wherein to transmit the PRACH configuration information, the at least one processor is configured to transmit a PRACH preamble and corresponding occasion information that schedules transmission of the PRACH message, and wherein the PRACH message is the PRACH preamble in a PRACH procedure between the UE and the base station.

S. The method as paragraph R recites, wherein to transmit the PRACH configuration information, the at least one processor is configured to transmitting the PRACH preamble and corresponding occasion information via a system information block #1 (SIB1) or dedicated signaling.

T. The method as paragraph R recites, wherein the one or more AIC parameters include at least one of an amount of one or more AIC subcarriers to employ, a position of the one or more AIC subcarriers, or one or more symbols modulated on the one or more AIC subcarriers.

U. The method as any of paragraphs O-T recite, wherein the PRACH message is a physical uplink shared channel (PUSCH) message transmitted between the UE and the base station in a PRACH procedure, and to transmit the PRACH configuration information, the at least one processor is configured to transmit the PRACH configuration information via a physical downlink control channel (PDCCH), the PRACH configuration information scheduling transmission of the PUSCH message.

V. The method as paragraph U recites, wherein the PDCCH includes one or more bit fields indicating the one or more AIC parameters.

W. The method as paragraph U recites, wherein the one or more AIC parameters include at least one of an amount of one or more AIC subcarriers to employ, a position of the one or more AIC subcarriers, or one or more symbols modulated on the one or more AIC subcarriers.

X. The method as any of paragraphs O-W recite, wherein the PRACH message is a timing advance free PUSCH message of a two-step PRACH procedure between the UE and the base station, and to transmit the PRACH configuration information, the at least one processor is configured to transmit the PRACH configuration information within a physical uplink shared channel (PUSCH) configuration message.

Y. The method as paragraph X recites, wherein to transmit the PRACH configuration information, the at least one processor is configured to transmit the one or more AIC parameters via one or more radio resource control (RRC) parameters of the PUSCH configuration message.

Z. The method as paragraph X recites, wherein the one or more AIC parameters include at least one of an amount of one or more AIC subcarriers to employ, a position of the one or more AIC subcarriers, or a power level of the one or more AIC subcarriers.

AA. A base station for wireless communication, comprising a memory storing computer-executable instructions; and at least one processor coupled with the memory and configured to execute the computer-executable instructions to perform the method of any of paragraphs O-Z.

AB. A base station for wireless communication, comprising means for performing the method of any of paragraphs O-Z.

AC. A non-transitory computer-readable medium storing computer executable code, the code when executed by a processor causes the processor to perform the method of any of paragraphs O-Z.

What is claimed is:

1. A user equipment (UE) for wireless communication, comprising:
    a memory storing computer-executable instructions; and
    at least one processor coupled with the memory and configured to execute the computer-executable instructions to:
        receive, from a base station, physical layer random-access channel (PRACH) configuration information including one or more active interference cancellation (AIC) parameters for applying AIC to a PRACH message to the base station; and
        transmit, to the base station, the PRACH message contemporaneously with one or more AIC subcarriers based on the one or more AIC parameters.

2. The UE of claim 1, wherein the PRACH configuration information includes a PRACH preamble and corresponding occasion information scheduling transmission of the PRACH message, and the PRACH message is the PRACH preamble in a PRACH procedure between the UE and the base station.

3. The UE of claim 2, wherein to receive the PRACH configuration information, the at least one processor is configured to receive the PRACH configuration information via a system information block #1 (SIB1) or dedicated signaling.

4. The UE of claim 2, wherein the one or more AIC parameters include at least one of an amount of the one or more AIC subcarriers, a position of the one or more AIC subcarriers, or one or more symbols modulated on the one or more AIC subcarriers.

5. The UE of claim 1, wherein the PRACH configuration information is transmitted via a physical downlink control channel (PDCCH) and schedules transmission of the PRACH message, and the PRACH message is a physical uplink shared channel (PUSCH) message transmitted from the UE to the base station in a PRACH procedure.

6. The UE of claim 5, wherein the PDCCH includes one or more bit fields indicating the one or more AIC parameters.

7. The UE of claim 5, wherein the one or more AIC parameters include at least one of an amount of the one or more AIC subcarriers, a position of the one or more AIC subcarriers, or a power level of the one or more AIC subcarriers.

8. The UE of claim 1, wherein the PRACH configuration information is included in a physical uplink shared channel (PUSCH) configuration message, and the PRACH message is a timing advance free PUSCH message of a two-step PRACH procedure between the UE and the base station.

9. The UE of claim 8, wherein to receive the PRACH configuration information, the at least one processor is configured to receive the one or more AIC parameters via one or more radio resource control (RRC) parameters of the PUSCH configuration message.

10. The UE of claim 8, wherein the one or more AIC parameters include at least one of an amount of the one or more AIC subcarriers, a position of the one or more AIC subcarriers, or a power level of the one or more AIC subcarriers.

11. The UE of claim 8, wherein the one or more AIC parameters are a first one or more AIC parameters, the PRACH configuration information includes the first one or more AIC parameters for a first subcarrier spacing (SCS) carrier configuration or a first frequency location associated with a PUSCH and a second one or more AIC parameters for a second SCS carrier configuration or a second frequency location associated with the PUSCH, and the at least one processor is configured to determine to apply the first one or more AIC parameters based on application of the first SCS carrier configuration or the first frequency location associated with the PUSCH.

12. A method of wireless communication at a UE, comprising:
receiving, from a base station, physical layer random-access channel (PRACH) configuration information including one or more active interference cancellation (AIC) parameters for applying AIC to a PRACH message to the base station; and
transmitting, to the base station, the PRACH message contemporaneously with one or more AIC subcarriers based on the one or more AIC parameters.

13. The method of claim 12, wherein receiving the PRACH configuration information comprises receiving a PRACH preamble and corresponding occasion information that schedules transmission of the PRACH message, and transmitting the PRACH message comprises transmitting the PRACH preamble in a PRACH procedure between the UE and the base station.

14. The method of claim 12, wherein the PRACH configuration information schedules transmission of the PRACH message, the PRACH message is a physical uplink shared channel (PUSCH) message transmitted between the UE and the base station in a PRACH procedure, and receiving the PRACH configuration information comprises receiving the PRACH configuration information via a physical downlink control channel (PDCCH).

15. The method of claim 12, wherein receiving the PRACH configuration information comprises receiving the PRACH configuration information in a physical uplink shared channel (PUSCH) configuration message, and wherein the PRACH message is a timing advance free PUSCH message of a two-step PRACH procedure between the UE and the base station.

16. A base station for wireless communication, comprising:
a memory storing computer-executable instructions; and
at least one processor coupled with the memory and configured to execute the computer-executable instructions to:
identify one or more active interference cancellation (AIC) parameters for a user equipment (UE) camped on a network based on resource scheduling information associated with a plurality of UEs; and
transmit, to the UE, physical layer random-access channel (PRACH) configuration information including the one or more active interference cancellation (AIC) parameters for transmission of AIC subcarriers contemporaneously with a PRACH message.

17. The base station of claim 16, wherein the at least one processor is configured to receive, from the UE, the PRACH message with one or more AIC subcarriers based on the one or more AIC parameters.

18. The base station of claim 16, wherein to transmit the PRACH configuration information, the at least one processor is configured to transmit a PRACH preamble and corresponding occasion information that schedules transmission of the PRACH message, and wherein the PRACH message is the PRACH preamble in a PRACH procedure between the UE and the base station.

19. The base station of claim 18, wherein to transmit the PRACH configuration information, the at least one processor is configured to transmitting the PRACH preamble and corresponding occasion information via a system information block #1 (SIB1) or dedicated signaling.

20. The base station of claim 18, wherein the one or more AIC parameters include at least one of an amount of one or more AIC subcarriers to employ, a position of the one or more AIC subcarriers, or one or more symbols modulated on the one or more AIC subcarriers.

21. The base station of claim 16, wherein the PRACH message is a physical uplink shared channel (PUSCH) message transmitted between the UE and the base station in a PRACH procedure, and to transmit the PRACH configuration information, the at least one processor is configured to transmit the PRACH configuration information via a physical downlink control channel (PDCCH), the PRACH configuration information scheduling transmission of the PUSCH message.

22. The base station of claim 21, wherein the PDCCH includes one or more bit fields indicating the one or more AIC parameters.

23. The base station of claim 21, wherein the one or more AIC parameters include at least one of an amount of one or more AIC subcarriers to employ, a position of the one or more AIC subcarriers, or one or more symbols modulated on the one or more AIC subcarriers.

24. The base station of claim 16, wherein the PRACH message is a timing advance free PUSCH message of a two-step PRACH procedure between the UE and the base station, and to transmit the PRACH configuration information, the at least one processor is configured to transmit the PRACH configuration information within a physical uplink shared channel (PUSCH) configuration message.

25. The base station of claim 24, wherein to transmit the PRACH configuration information, the at least one processor is configured to transmit the one or more AIC parameters via one or more radio resource control (RRC) parameters of the PUSCH configuration message.

26. The base station of claim 24, wherein the one or more AIC parameters include at least one of an amount of one or more AIC subcarriers to employ, a position of the one or more AIC subcarriers, or a power level of the one or more AIC subcarriers.

27. A method of wireless communication at a base station, comprising:
determining one or more active interference cancellation (AIC) parameters for a user equipment (UE) camped on a network based on resource scheduling information associated with a plurality of UEs; and transmitting, to the UE, physical layer random-access channel (PRACH) configuration information including the one or more active interference cancellation (AIC) parameters for transmission of AIC subcarriers contemporaneously with a PRACH message.

28. The method of claim 27, wherein transmitting the PRACH configuration information comprises transmitting a PRACH preamble and corresponding occasion information that schedules transmission of the PRACH message, and wherein the PRACH message is the PRACH preamble of a PRACH procedure between the UE and the base station.

29. The method of claim 27, wherein the PRACH message is a third message transmitted between the UE and the base station in a PRACH procedure, and transmitting the PRACH configuration information comprises transmitting the PRACH configuration information via a physical downlink control channel (PDCCH), the PRACH configuration information scheduling transmission of the PRACH message via the PDCCH.

30. The method of claim 27, wherein the PRACH message is a timing advance free PUSCH message of a two-step PRACH procedure between the UE and the base station, and to transmitting the PRACH configuration information comprises transmitting the PRACH configuration information within a physical uplink shared channel (PUSCH) configuration message.

* * * * *